Patented Oct. 21, 1952

2,614,931

UNITED STATES PATENT OFFICE 2,614,931

METHOD OF PREPARING CELLULOSE ESTER-SILVER-HALIDE PHOTOGRAPHIC EMULSIONS

Wesley G. Lowe and Gordon F. Frame, Rochester, N. Y., assignors to Eastman Kodak Company, Rochester, N. Y., a corporation of New Jersey No Drawing. Application August 13, 1947, Serial No. 768,479

14 Claims. (Cl. 95—7)

This invention relates to cellulose ester-silver halide photographic emulsions in which a gelatin derivative dispersion of the silver halide is mixed with the cellulose ester to form the emulsion.

Photographic emulsions have been previously prepared in which cellulose esters have been employed as the vehicle, however, in many cases the grain size of the silver halide is not that desired and sensitivity may be limited. Gelatin which is commonly employed for peptizing silver halide is not compatible with cellulose esters. Hydrolyzed gelatin which may be employed as a peptizer is not well adapted for emulsion washing operations in that it tends to diffuse during emulsion washing so that an inevitable silver-loss occurs. Synthetic resins have been considered for use in forming silver-halide dispersions to be employed in preparing cellulose ester emulsions, but the sensitivity possible with many of these leaves much to be desired.

One object of our invention is to provide a method of preparing silver halide-cellulose ester photographic emulsions in which the peptized grains of silver halide may be washed before mixing with the vehicle. Another object of our invention is to prepare silver halide-cellulose ester photographic emulsions to which a high degree of sensitivity may be imparted. Other objects of our invention will appear herein.

We have found that dispersions of silver halide using a gelatin derivative as the dispersing agent when mixed with cellulose esters produce compatible emulsions to which a high degree of sensitivity may be imparted and also make possible emulsions substantially free of salts and other unwanted water-soluble impurities. We have found that such emulsions have the advantages of ready Ostwald ripening and that maximum speed can be obtained by heating as is standard practice with gelatin emulsions.

Gelatin derivatives such as are useful in emulsions in accordance with our invention are prepared by reacting an aromatic sulfonyl chloride, a carboxylic acid chloride, a carboxylic acid anhydride, an aromatic isocyanate or a 1,4-diketone with gelatin at an elevated pH, such as 8–12 at a temperature of 20–60° C. Some of the compounds which may be reacted with gelatin to form gelatin derivatives suitable for use in our invention are as follows:

Sulfonyl chlorides

Benzene sulfonyl chloride
p-Methoxybenzene sulfonyl chloride
p-Phenoxybenzene sulfonyl chloride
p-Bromobenzene sulfonyl chloride
p-Toluene sulfonyl chloride
m-Nitrobenzene sulfonyl chloride
m-Sulfobenzoyl dichloride
Naphthalene-β-sulfonyl chloride
p-Chlorobenzene sulfonyl chloride
3-Nitro-4-aminobenzene sulfonyl chloride
3-Carboxy-4-bromobenzene sulfonyl chloride
1-Chlorosulfonyl-2-hydroxy-3-naphthoic acid
Quinoline-8-sulfonyl chloride
m-Carboxybenzene sufonyl chloride
2-Amino-5-methylbenzene-sulfonyl chloride

Carboxylic acid chlorides

Phthalyl chloride
p-Nitrobenzoyl chloride
Benzoyl chloride
Ethyl chlorocarbonate
Furoyl chloride

Acid anhydrides

Phthalic anhydride
Benzoic anhydride
Succinic anhydride
Maleic anhydride
Isatoic anhydride

Isocyanates

Phenyl isocyanate
p-Bromophenyl isocyanate
p-Chlorophenyl isocyanate
p-Tolyl isocyanate
p-Nitrophenyl isocyanate
α-Naphthyl isocyanate
β-Naphthyl isocyanate

1,4-diketones

Acetonyl acetone
Dimethyl acetonyl acetone
Diethyl diacetyl succinate

The following examples illustrate the preparation of gelatin derivatives. The gelatin derivatives, generally, listed above may be prepared in a like manner.

*Example 1.*—m-Carboxy benzene sulfonyl chloride derivative of gelatin. 100 parts of gelatin were dissolved in 625 parts of distilled water at 50° C., and this solution was then cooled to 40° C. A pH of 10 was imparted to this solution by incorporating therein with stirring sufficient 10% aqueous sodium hydroxide to bring the pH of the solution to this value. Then over a period of twenty minutes a solution of 10.5 parts of m-carboxy benzene sulfonyl chloride in solution in 50 parts of isopropyl alcohol was added while maintaining the temperature at 40° C. and adding sodium hydroxide solution from time to time so that the pH remained at 10±0.2. After the addition of the reagent the solution was stirred for ten minutes at 40° C. The pH was then adjusted to 7 by adding dilute sulfuric acid thereto, and the mass was allowed to solidify in a refrigerator. The derivative may be used without washing, or it may be washed as described below. After shredding into noodles the gelatin was washed free from the reaction products with cold water and dried in a current of warm dry air.

*Example 2.*—Maleic anhydride derivative of gelatin. A solution of 100 parts of gelatin in 600 parts of distilled water at 40° C. was prepared and aqueous 10% sodium hydroxide was added thereto to bring the pH to 10. The solution was stirred vigorously and a solution of 10 parts of maleic anhydride in 50 parts of dry acetone was added over a period of ten minutes, sodium hydroxide solution being added from time to time to maintain the pH at approximately 10. The temperature was kept at 40° C. After the addition of the anhydride, the solution was stirred for ten minutes and then dilute acid was added to adjust the pH to 7. The gelatin derivative may be washed before drying, or, if desired, it may be dried directly without washing. Care must be exercised not to wash the gelatin derivative for too long a time as it absorbs water quite readily and may make the gelatin solution so dilute that it is difficult to dry.

*Example 3.*—Phthalic anhydride derivative of gelatin. In a manner similar to that described in the preceding example a gelatin derivative is prepared from 100 parts of gelatin by adding thereto a solution of 7 parts of phthalic anhydride in 50 parts of dry acetone at the prescribed pH and temperature. The phthalic anhydride derivative is then washed and dried as described in the preceding examples, or it may be dried directly without washing.

The cellulose esters useful in preparing photographic emulsions in accordance with our invention are the far-hydrolyzed lower fatty acid esters of cellulose having an acyl content of 19–33%, preferably 19–26% as described in Salo Patent No. 2,110,491. For example, a cellulose acetate having an acetyl content within the range of 22–24% is eminently suited for use as a vehicle for a photographic emulsion. In addition to cellulose acetates, mixed esters of cellulose such as cellulose acetate propionate and cellulose acetate butyrate, particularly those in which acetyl is the predominating acyl, are useful as vehicles for photographic emulsions.

In the use of the far-hydrolyzed cellulose esters, water is primarily employed as the solvent but it is also necessary to include water-miscible organic solvents such as acetone, ethyl, or n-propyl alcohol, ethyl or methyl cellosolve or the like in the composition.

In its broadest aspects our invention comprises forming a dispersion of silver-halide grains in a solution of a gelatin derivative and subsequently adding that silver-halide dispersion to a solution of the cellulose ester to be employed as the vehicle thereby forming the photographic emulsion. Our invention, however, is particularly valuable for washed silver halide-cellulose ester emulsions.

The dispersion of silver-halide grains in a gelatin derivative may be prepared by either of two methods: (1) the gelatin derivative is used as the peptizer in the preparation of the silver halide or (2) the silver halide is prepared in an aqueous solution of gelatin and the gelatin is then converted into the gelatin derivative.

In the first method a solution of a soluble silver salt is reacted with a solution of a soluble alkali-metal halide, such as potassium bromide (chloride or iodide) in an aqueous solution of a gelatin derivative with rapid stirring whereby silver-halide grains of small size are obtained suspended in the gelatin derivative solution. In the second method the silver halide formation occurs first in gelatin which is then converted to a derivative.

After the dispersion of silver halide in gelatin derivative has been formed, it is next desirable to remove water-soluble salts therefrom by washing. This is conveniently accomplished by acidifying the mass with an acid which has no derogatory effect on the dispersion, to a pH of 3.0–4.5 whereupon the gelatin derivative coagulates and envelops the silver-halide grains forming a granular coagulum. As considerable neutral electrolyte is present (being one of the products of the reaction forming silver halide) the coagulation takes place readily upon acidifying and the adjustment of pH is not particularly critical. The granular coagulum settles and the liquid may be removed therefrom by decanting or siphoning. For some types of emulsions this coagulum may be redispersed and used without further washing, for instance, in the preparation of emulsions for the coating of paper and other permeable supports.

In the preparation of emulsion for film coating it may be desirable to further reduce the content of soluble salts. The coagulum may be rinsed by treatment with cool water, preferably with the pH adjusted to the range of the isoelectric point of the gelatin derivative. The number of rinses necessary to reduce the salt content of the coagulum to the desired point is usually within the range of 1 to 4 changes of water.

As an alternative method of washing, the coagulum may be dissolved in water at an elevated pH. For instance, sufficient water and sodium or ammonium hydroxide are added so that the pH is of the order of 6 or more. The temperature of the solution is raised to approximately 40° C., and the whole stirred for a few minutes to effect re-dispersion of the coagulum. The gelatin derivative may then be re-coagulated by the addition of acid to reduce the pH of the solution to the coagulation point of the derivative. As neutral electrolyte is substantially absent, the range of pH in which rapid coagulation occurs is considerably more critical than in the first coagulation, being 3.8–4.5. This coagulation is conveniently done within the pH range 3.8–4.2.

After the addition of acid, the coagulum will again settle. Separation from the mother liquor is effected by decanting or siphoning. Usually this one cycle of re-coagulation and redispersion is sufficient but it may be repeated, if desired, as often as considered necessary.

The coagulum which has been washed by either of the two general methods outlined above may be re-dispersed and used in forming a silver halide-cellulose ester photographic emulsion by re-dispersing the silver halide in water, adding sufficient water-soluble organic solvent such as alcohol, acetone, or cellosolve so that the solution becomes a solvent for cellulose ester, and finally adding a solution of cellulose ester. Re-dispersion of the silver-halide coagulum is effected by adjusting the pH to 6.0 or higher and stirring at 40° C. to 50° C. until the coagulum has dispersed. The emulsions so prepared, respond readily to the standard methods of chemical sensitization or after ripening and optical sensitization.

Any of the acids which are compatible may be employed for lowering the pH as referred to above. Sulfuric acid and acetic acid have both been found to be satisfactory in this connection, the only criterion being that it lowers the pH to the desired range and does not derogatorily affect either the silver halide or the dispersing agent.

The following examples are illustrative of our invention:

*Example 4.*—A dispersion of silver halide, such as prepared by reacting silver nitrate and potassium bromide and iodide in an aqueous solution of m-carboxy benzene sulfonyl chloride derivative of gelatin was prepared and contained 100 g. of silver halide dispersed with 12.3 g. of the m-carboxybenzene sulfonyl derivative of gelatin in 2045 cc. of water. This dispersion was treated by stirring in aqueous sulfuric acid until the pH of the whole was reduced to 3.0. On standing the silver-halide grains and the gelatin derivative precipitated in a granular mass. The supernatant liquid was decanted and the grains were further washed by applying acidulated water thereto and decanting. Sufficient water was then added to the grains to make a total weight of 455 g. The grains were repeptized by heating for 15-60 minutes at 50° C., with the pH of the solution adjusted to 7.5 by the addition of aqueous ammonia, sodium hydroxide, etc., thereto, the pH of the dispersion was adjusted to 6 and a small quantity of potassium bromide was added in the manner well known in the art. Also a small quantity of a compound containing labile sulfur, in this case, allyl thiourea was added. The amount of the sulfur-sensitizing material added usually lies in the range of 1-25 mg. with the quantities of the other material employed in the example. The amount of sulfur compound to be employed depends upon the photographic behavior of the particular sulfur compound used and the properties which are desired. The dispersion was heated to 55° C. and maintained at that temperature until test coatings made by adding portions of the dispersion to the vehicle at 40° C. and coating on plates and testing sensitometrically gave optimum speed and contrast with practicable fog values. At that point the suitably heat-treated dispersion was cooled to 40° C. and there was added to the dispersed grains a mixture of 211 cc. of ethyl alcohol, 75 cc. of ethyl cellosolve, and 1818 cc. of a solution of cellulose acetate as will be described below. 75 cc. of water and 16 cc. of acetone were then added to obtain the desired viscosity and coating properties. The pH was adjusted to 6.0. The emulsion was then coated onto a film base and rapid setting was achieved. The film was exposed and developed in D-72 developer. It was then fixed in F-5 fixing bath. The emulsion was found to be free of fog, showed good photographic quality and after fixing and washing, it was found to dry rapidly to a clear homogeneous film.

*Example 5.*—The emulsion prepared in the preceding example was found to be more viscous than desired for coating paper. It was, therefore, diluted by adding 50 cc. of a solution of the following proportions to each 100 cc. of the emulsion: 155 cc. of water, 40 cc. of ethyl alcohol, 40 cc. of ethyl cellosolve, and 10 cc. of acetone. The resulting emulsion was coated on paper where it set rapidly and after drying showed good physical and photographic properties upon exposure and processing.

*Example 6.*—Several emulsions were prepared in the same manner as described in Example 4 except that instead of the m-carboxybenzene sulfonyl chloride derivative of gelatin, the following gelatin derivatives were employed as peptizers:

1. Maleic anhydride derivative of gelatin
2. Phthalic anhydride derivative of gelatin
3. Benzene sulfonyl chloride derivative of gelatin
4. Benzoyl chloride derivative of gelatin
5. Furoyl chloride derivative of gelatin
6. Phenyl isocyanate derivative of gelatin
7. P-tolyl isocyanate derivative of gelatin These derivatives of gelatin are prepared by reacting thereon with an acid chloride, acid anhydride or an isocyanate at a pH of 8-12. In each case satisfactory coatings were obtained on both film and paper, and the resulting emulsions exhibited good physical and photographic properties.

The cellulose acetate solution which was employed in Examples 4 and 6 was prepared by dissolving 350 g. of cellulose acetate (dry weight) having an acetyl content of 23.5% in a solvent mixture consisting of 2500 cc. of water, 640 cc. of alcohol, 640 cc. of ethyl cellosolve, and 160 cc. of acetone.

It is to be understood that all of the emulsions described herein were prepared under darkened conditions so as to retain the sensitiveness of the silver halide prepared.

We claim:

1. A method of preparing washed cellulose ester-silver halide photographic emulsions which comprises the steps of preparing a dispersion of silver halide in an aqueous solution of a gelatin derivative whose presence renders the so-obtained dispersion coagulable at a pH within the range of pH 3-4.5, which derivative is selected from the group consisting of the aromatic sulfonyl chloride derivatives of gelatin, the carboxylic acid chloride derivatives of gelatin, the carboxylic acid anhydride derivatives of gelatin, the aromatic isocyanate derivatives of gelatin and the 1,4 diketone derivatives of gelatin, coagulating the dispersion of silver halide in gelatin derivative by adjusting to said pH whereby silver halide-gelatin derivative grains are formed, separating the silver halide-gelatin derivative grains thus formed from the liquid portion of the mass and incorporating the silver halide-gelatin derivative grains in an aqueous solution of a far-hydrolyzed cellulose ester, thereby forming a cellulose ester-silver halide photographic emulsion.

2. A method of preparing washed cellulose ester-silver halide photographic emulsions which comprises the steps of mixing together a water-soluble silver salt and a water-soluble halide salt in an aqueous solution of a gelatin derivative whose presence renders the so-formed dispersion coagulable at a pH within the range of pH 3–4.5, which derivative is selected from the group consisting of the aromatic sulfonyl chloride derivatives of gelatin, the carboxylic acid anhydride derivatives of gelatin, the aromatic isocyanate derivatives of gelatin and the 1,4 diketone derivatives of gelatin, coagulating the dispersion of silver halide in gelatin derivative by adjusting to said pH whereby silver halide-gelatin derivative grains are formed, separating the silver halide-gelatin derivative grains thus formed from the liquid portion of the mass and incorporating the silver halide-gelatin derivative grains in an aqueous solution of a far-hydrolyzed cellulose ester, thereby forming a cellulose ester-silver halide photographic emulsion.

3. A method of preparing washed cellulose ester-silver halide photographic emulsions which comprises the steps of preparing a dispersion of sliver halide by mixing together a water-soluble silver salt and a water-soluble halide salt in an aqueous solution of gelatin, converting the gelatin to a gelatin derivative by treating the mass at an alkaline pH with a reactant selected from the group consisting of the aromatic sulfonyl chlorides, the carboxylic acid chlorides, the carboxylic acid anhydrides, the aromatic isocyanates and the 1,4 diketones whereby a gelatin derivative is formed from the gelatin therein, which derivative renders the silver halide dispersion coagulable at a pH within the range of pH 3–4.5, coagulating the dispersion of silver halide-gelatin derivative by adjusting to said pH whereby silver halide-gelatin derivative grains are formed, separating the thus-formed silver halide-gelatin derivative grains from the liquid portion of the mass and incorporating those grains in an aqueous solution of a far-hydrolyzed cellulose ester thereby forming a cellulose ester-silver halide photographic emulsion.

4. A method of preparing washed cellulose ester-silver halide photographic emulsions which comprises the steps of preparing a dispersion of silver halide in an aqueous solution of an aromatic sulfonyl chloride derivative of gelatin, which gelatin derivative renders the so-obtained dispersion coagulable at a pH within the range of pH 3–4.5, coagulating the dispersion of silver halide in gelatin derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

5. A method of preparing washed cellulose ester-silver halide photographic emulsions which comprises the steps of preparing a dispersion of silver halide in an aqueous solution of a carboxylic acid chloride derivative of gelatin, which gelatin derivative renders the so-obtained dispersion coagulable at a pH within the range of pH 3–4.5, coagulating the dispersion of silver halide in gelatin derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

6. A method of preparing washed cellulose ester-silver halide photographic emulsions which comprises the steps of preparing a dispersion of silver halide in an aqueous solution of a carboxylic acid anhydride derivative of gelatin, which gelatin derivative renders the so-obtained dispersion coagulable at a pH within the range of pH 3–4.5, coagulating the dispersion of silver halide in gelatin derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

7. A method of preparing washed cellulose ester-silver halide photographic emulsions which comprises the steps of preparing a dispersion of silver halide in an aqueous solution of an aromatic isocyanate derivative of gelatin, which gelatin derivative renders the so-obtained dispersion coagulable at a pH within the range of pH 3–4.5, coagulating the dispersion of silver halide in gelatin derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

8. A method of preparing washed cellulose ester-silver halide photographic emulsions which comprises the steps of preparing a dispersion of silver halide in an aqueous solution of a 1,4 diketone derivative of gelatin, which gelatin derivative renders the so-obtained dispersion coagulable at a pH within the range of pH 3–4.5, coagulating the dispersion of silver halide in gelatin derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

9. A method of preparing washed cellulose ester-silver halide photographic emulsions which comprises the steps of preparing a dispersion of silver halide in an aqueous solution of an m-carboxy benzene sulfonyl chloride derivative of gelatin whose presence renders the so-obtained dispersion coagulable at a pH within the range of pH 3–4.5, coagulating the dispersion of silver halide derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

10. A method of preparing washed cellulose ester-silver halide photographic emulsions which comprises the steps of preparing a dispersion of silver halide in an aqueous solution of a benzoyl chloride derivative of gelatin whose presence renders the so-obtained dispersion coagulable at a pH within the range of pH 3–4.5, coagulating the dispersion of silver halide derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

11. A method of preparing washed cellulose ester-silver halide photographic emulsions which comprises the steps of preparing a dispersion of silver halide in an aqueous solution of a phthalic anhydride derivative of gelatin whose presence renders the so-obtained dispersion coagulable at a pH within the range of pH 3–4.5, coagulating the dispersion of silver halide derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

12. A method of preparing washed cellulose ester-silver halide photographic emulsions which comprises the steps of preparing a dispersion of silver halide in an aqueous solution of a phenyl isocyanate derivative of gelatin whose presence renders the so-obtained dispersion coagulable at a pH within the range of pH 3–4.5, coagulating the dispersion of silver halide derivative by adjusting to said pH whereby silver halide-gelatin derivative grains are formed, separating those grains from the liquid portion of the mass and incorporating them in an aqueous solution of a far-hydrolyzed cellulose ester thereby forming a cellulose ester-silver halide photographic emulsion.

13. A method of preparing washed cellulose ester-silver halide photographic emulsions which comprises the steps of preparing a dispersion of silver halide in an aqueous solution of a phthalic anhydride derivative of gelatin which derivative renders the so-obtained dispersion coagulable at a pH within the range of pH 3–4.5, coagulating the dispersion of silver halide in gelatin derivative by adjusting to said pH whereby silver halide-gelatin derivative grains are formed, separating those grains from the liquid portion of the mass and incorporating those grains in an aqueous solution of cellulose acetate having an acetyl content of approximately 23.5%, thereby forming a cellulose ester-silver halide photographic emulsion.

14. A method of preparing washed cellulose ester-silver halide photographic emulsions which comprises the steps of preparing a dispersion of silver halide in an aqueous solution of a gelatin derivative whose presence renders the so-obtained dispersion coagulable at a pH within the range of pH 3–4.5, which derivative is selected from the group consisting of the aromatic sulfonyl chloride derivatives of gelatin, the carboxylic acid chloride derivatives of gelatin, the carboxylic acid anhydride derivatives of gelatin, the aromatic isocyanate derivatives of gelatin, and the 1,4 diketone derivatives of gelatin, coagulating the dispersion of silver halide in gelatin derivative by adjusting to said pH whereby silver halide-gelatin derivative grains are formed, separating those grains from the liquid portion of the mass, redispersing those grains in water to which has been imparted a pH at which the grains will disperse, recoagulating the suspension of silver halide in gelatin derivative by adjusting to a recoagulating pH whereby silver halide-gelatin derivative grains are again formed, separating those grains from the liquid portion of the mass and incorporating them in an aqueous solution of a far-hydrolyzed cellulose ester, thereby forming a cellulose ester-silver halide photographic emulsion.

WESLEY G. LOWE.
GORDON F. FRAME.

REFERENCES CITED

The following references are of record in the file of this patent:

UNITED STATES PATENTS

| Number | Name | Date |
|---|---|---|
| 1,844,716 | Lambert | Feb. 9, 1932 |
| 2,139,774 | Sheppard et al. | Dec. 13, 1938 |
| 2,282,001 | Russell et al. | May 5, 1942 |
| 2,489,341 | Waller | Nov. 29, 1949 |

FOREIGN PATENTS

| Number | Country | Date |
|---|---|---|
| 479,419 | Great Britain | Feb. 4, 1938 |
| 496,049 | Great Britain | Nov. 21, 1938 |
| 537,256 | Great Britain | June 16, 1941 |
| 580,504 | Great Britain | Sept. 10, 1946 |